June 13, 1944.     C. O. BECKLEY     2,351,093
CUTTER
Filed Aug. 11, 1942
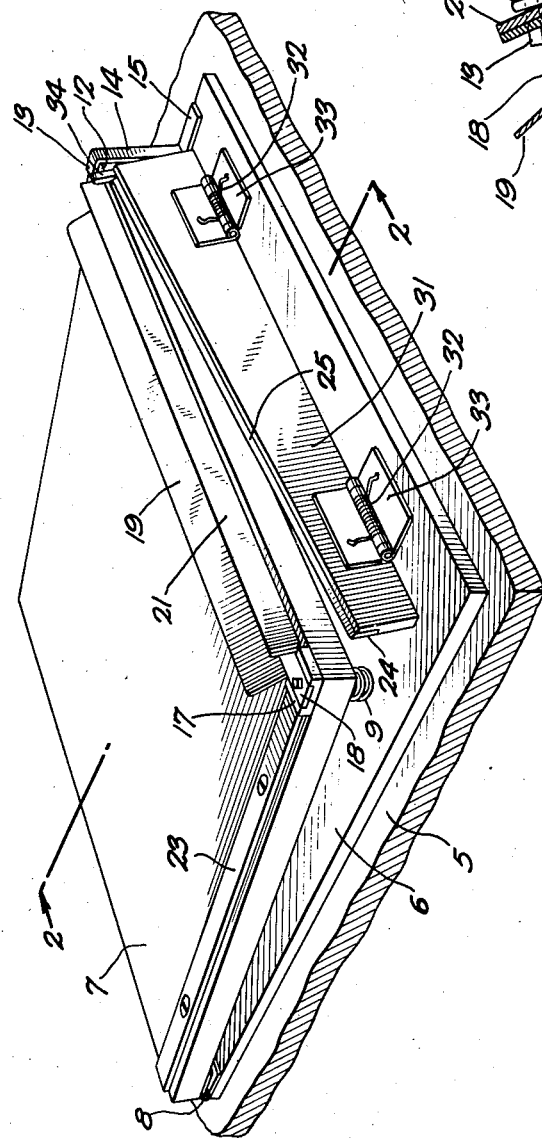
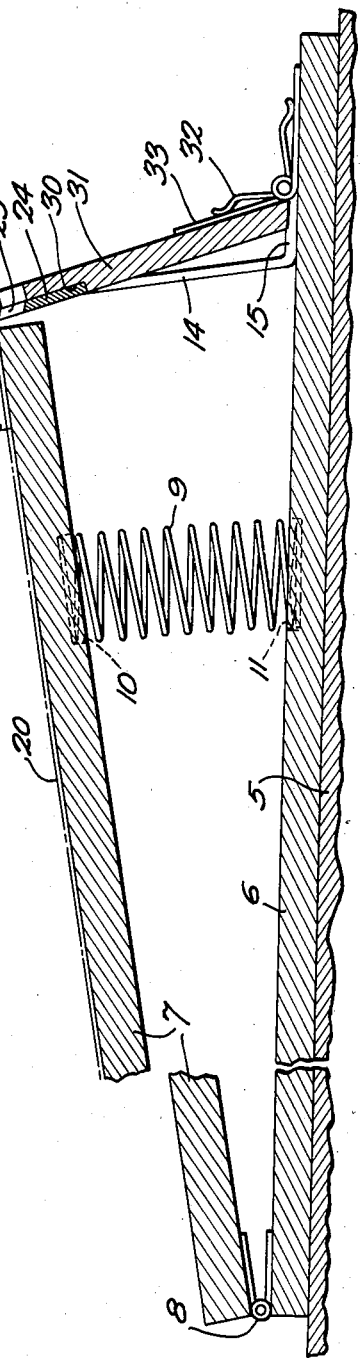
INVENTOR
C. O. BECKLEY
BY Harry L. Duff
ATTORNEY

Patented June 13, 1944

2,351,093

UNITED STATES PATENT OFFICE 2,351,093

CUTTER

Charles O. Beckley, Chicago, Ill., assignor to Western Electric Company, Incorporated, New York, N. Y., a corporation of New York Application August 11, 1942, Serial No. 454,436

1 Claim. (Cl. 164—43)

This invention relates to a cutter and more particularly to a manually operable device for trimming or cutting sheets of paper.

It is an object of the present invention to provide a simple, safe and easily operable cutter for expeditiously cutting sheets.

In accordance with one embodiment of the invention as applied to a device for cutting individual blueprints from a continuous roll that has been printed on a commercial blueprint machine, a hinged table is provided having a cutting blade mounted upon it in spaced relation to its upper surface. The table is resiliently urged upwardly away from a relatively fixed cutting blade and a roll of paper to be cut into individual lengths may be fed manually over the upper surface of the table and under the blade mounted on the table, which also serves as a guide. When a line, on the paper along which the paper is to be cut, is in alignment with the blade on the table, the operator may push the table downwardly to shear the paper along the line in alignment with the blade on the table through the cooperating action of the two blades.

A better understanding of the invention may be had by reference to the following specification when considered in conjunction with the accompanying drawing, wherein Fig. 1 is a perspective view of an apparatus for cutting paper sheets made in accordance with the present invention and Fig. 2 is a longitudinal sectional view taken substantially along the line 2—2 of Fig. 1 in the direction of the arrows showing details of the construction of the apparatus.

Referring to the drawing, wherein like reference characters designate the same parts throughout the several views, the apparatus is designed for use upon a table 5, which may be arranged at any convenient height suitable to an operator using the apparatus. Mounted directly upon the table 5 is a plate 6 having a table portion 7 hinged to it by means of a piano type hinge 8. The table portion 7 is normally urged upwardly away from the plate 6 by means of coil springs 9, of which there may be any desired number interposed between the undersurface of the table portion 7 and plate 6, suitable pockets 10 and 11 being provided in the table portion 7 and plate 6 to position the springs with respect thereto. The table portion 7 is thus urged upwardly to carry a spacer block 12 upwardly into engagement with the substantially horizontally disposed portion 13 of a stop bracket 14, which has its lower end bent into a horizontal plane, as shown at 15, for attachment to the plate 6. The spacer block 12 at the right end of the table portion 7 cooperates with a spacer block 17 at the left front corner of the table portion 7 to support a blade positioning member 18 in spaced relation to the upper surface of the table portion 7. The blade positioning member 18 is L-shaped in cross section throughout most of its length, as shown in Fig. 2, and is provided with extending portions for attachment to the spacer blocks 12 and 17. Suitably fixed to the underside of the blade positioning member 18 is a paper guide 19 for guiding a strip of paper, indicated by the dot and dash lines at 20, into position under the blade positioning member 18 and under a blade 21 suitably mounted on the upwardly extending portion of the blade positioning member 18. Disposed at right angles to the edge 22 of the blade 21 and fixed on the upper surface of the table portion 7 is a guide member 23 for guiding the edge of the paper 20 so that the edge 22 of the blade 21 will cut the paper 20 at right angles to the edge of the paper engaged by the guide member 23.

Cooperating with the blade 21 is a blade 24 having its edge 25 disposed at an angle to the edge 22 of the blade 21 so that, when the blade 21 is reciprocated with respect to the blade 24, any paper which extends between the blades will be sheared. The blade 24 is mounted in a recess 30 formed along the upper edge of a blade supporting hinge 31, which is urged to rock in a counter-clockwise direction (Fig. 2) by the springs 32 of spring hinges 33 which support it on the plate 6. In order to prevent the blade supporting hinge 31 from rocking underneath the table portion 7, the blade 24 is provided with an upwardly extending arm 34, which bears against the right-hand edge of the blade 21.

In the operation of the apparatus, a sheet of paper 20, which is to be cut into predetermined lengths, may be fed manually under the guide 19 and the line thereon along which the paper is to be cut may be aligned with the edge 22 of the blade 21. When so aligned, the table portion 7 may be pressed downwardly against the action of the springs 9 to cut the paper along the selected line. If it is desired to have the paper cut at right angles to an edge thereof, the edge may be placed along the member 23 and then when the table portion 7 is pushed downwardly, the paper will be sheared to form a right angle corner. In the shearing operation, the blade 24 is urged toward the blade 21 so that the two edges will be in shearing engagement due to the fact that the springs 32 will urge the hinge member 31 to carry the blade 24 into position to be engaged by the edge 22 of the blade 21.

What is claimed is:

A cutter for sheet material comprising a depressible hinged table, a pair of spacer blocks mounted adjacent opposite edges of said table, a blade and guide positioning member mounted on said blocks and having angularly disposed portions held in spaced relation to the table, a cutting blade fixed to one of said angularly disposed portions and held in spaced relation parallel to the edge of the hinged table, a guide member for guiding sheet material under the cutting blade supported on another angularly disposed portion of the positioning member, said guide member being of appreciably greater height than the guide-positioning member to guide material to be cut to position adjacent the cutting blade on the table, a second cutting blade urged into cutting engagement with the first-mentioned blade, and means normally urging the table in a direction to hold the blades out of cutting engagement.

CHARLES O. BECKLEY.